United States Patent [19]

Blackband

[11] 4,120,619

[45] Oct. 17, 1978

[54] RECIPROCATING PUMPS FOR DISPENSING PASTES, LIQUIDS AND OTHER SUBSTANCES

[75] Inventor: Trevor William Blackband, Sheffield, England

[73] Assignee: Sterling-Winthrop Group Limited, London, England

[21] Appl. No.: 828,843

[22] Filed: Aug. 29, 1977

Related U.S. Application Data

[63] Continuation of Ser. No. 606,608, Aug. 21, 1975, abandoned.

[51] Int. Cl.² ............... F04B 7/00; G01F 11/06; G01F 11/38
[52] U.S. Cl. .................................... 417/511; 222/321
[58] Field of Search ............... 417/511, 512, 518; 222/321

[56] References Cited

U.S. PATENT DOCUMENTS

| 544,143 | 8/1895 | Wagner | 222/321 |
|---|---|---|---|
| 1,223,159 | 7/1917 | Zwicky | 417/512 |
| 1,477,381 | 12/1923 | Palm | 417/511 |
| 1,688,195 | 10/1928 | MacGregor | 417/512 |
| 1,711,752 | 5/1929 | Seidt | 222/321 |
| 1,850,926 | 3/1932 | Feyens | 417/518 |
| 2,067,601 | 1/1937 | Dobkin | 222/321 |
| 2,847,827 | 8/1958 | Johnson | 417/511 |
| 3,043,235 | 7/1962 | Smith | 417/511 |
| 3,211,346 | 10/1965 | Meshberg | 417/511 |
| 3,877,615 | 4/1975 | Stevens | 417/511 |

*Primary Examiner*—William L. Freeh
*Attorney, Agent, or Firm*—Wenderoth, Lind & Ponack

[57] ABSTRACT

A reciprocating pump for dispensing fluent substances comprises a piston slidable in a cylinder and defining a substance-trapping space at the inner end of the cylinder. Inlet and outlet ports are formed in the piston and connect with the space under the control of a tubular sleeve mounted on a reduced diameter inner end portion of the piston and capable of limited axial movement relative to the piston. Frictional engagement of the sleeve with the wall of the cylinder holds the sleeve stationary upon initial reciprocation of the piston within the cylinder and the piston slides through the sleeve to switch over the porting connections. During the subsequent portion of the stroke of the piston the sleeve and piston move as a unit.

12 Claims, 5 Drawing Figures

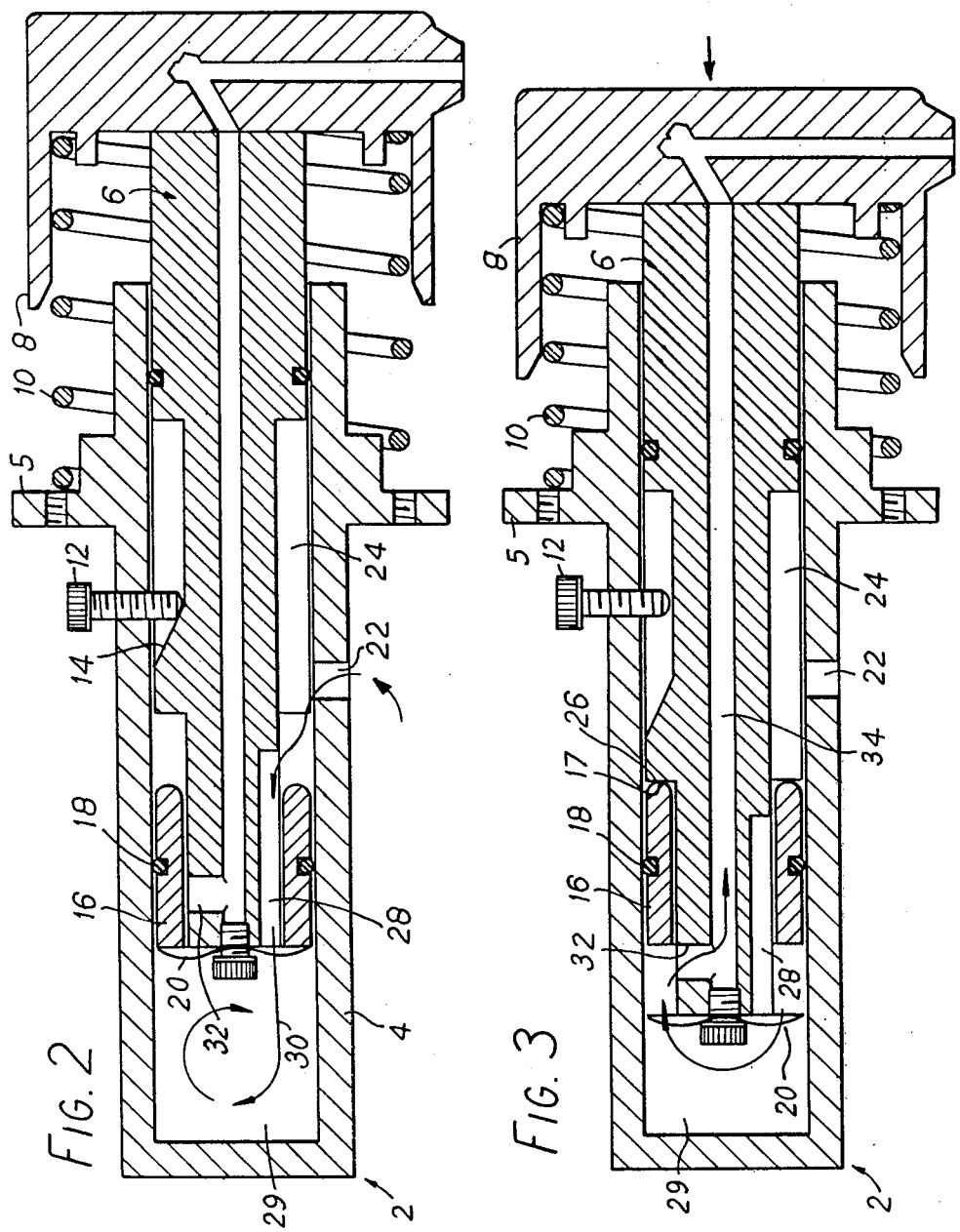

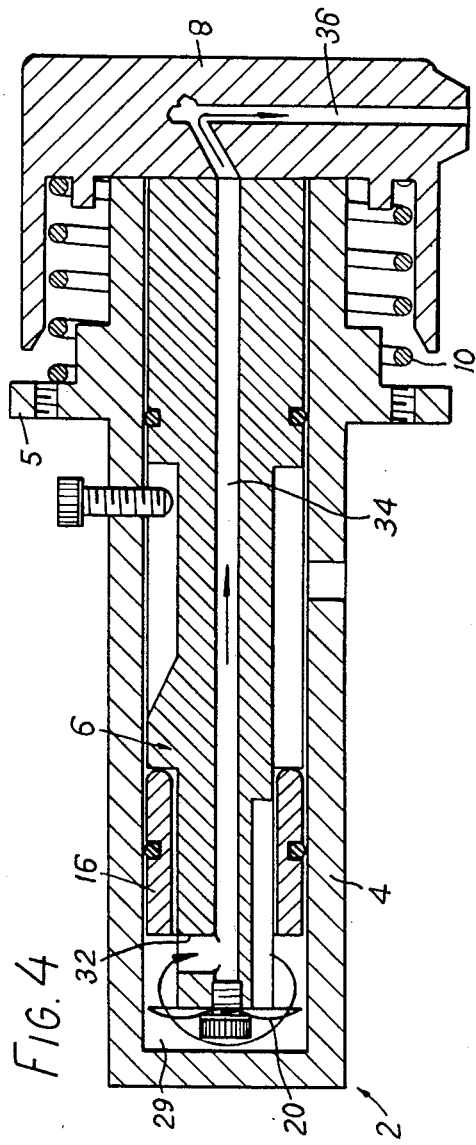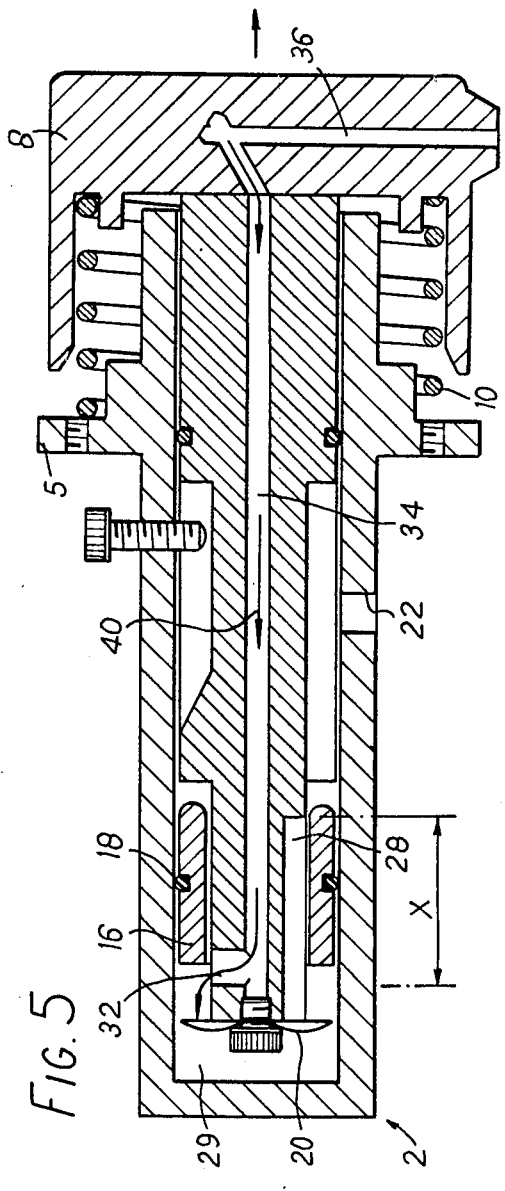

RECIPROCATING PUMPS FOR DISPENSING PASTES, LIQUIDS AND OTHER SUBSTANCES

This is a continuation of application Ser. No. 606,608, filed Aug. 21, 1975, now abandoned.

FIELD OF THE INVENTION

This invention relates to reciprocating pumps for dispensing fluent substances, such as soap and other detergent or toilet preparations, foods and the like in the form of paste, creams and liquids in different grades of viscosity.

DESCRIPTION OF THE PRIOR ART

Many reciprocating pumps for dispensing fluent substances have been proposed in the art. A number of the pumps have been successful in dispensing specific substances, but such pumps are generally of complicated design and expensive to construct when the dispensing of measured or metered amounts is required.

SUMMARY OF THE INVENTION

It is an object of the invention to provide a reliable pump of simple construction.

It is a further object of the invention to provide a reciprocating pump capable of dispensing fluent substances of different grades of viscosity.

A supplementary object is to provide a pump of simple construction which will dispense measured amounts of each substances.

The invention provides a reciprocating dispensing pump comprising a cylinder, a piston slidable in the cylinder and manually movable against the action of a spring from an outer position with respect to the cylinder to an inner position, a tubular sleeve slidably mounted on a reduced diameter inner end portion of the piston for movement relative to the piston between first and second axially displaced positions in response to movement of the piston from its outer to its inner position to control communication between the cylinder space inwardly of the inner end of the piston and an inlet port and an outlet port respectively provided in the piston, the outlet port leading into an outlet passageway extending longitudinally of the piston, and the tubular sleeve closing the outlet port when in its first position and closing the inlet port when in its second position.

The tubular sleeve acts as a slide valve mounted on the piston and which is slidable relative to both the piston and the cylinder to uncover the inlet and outlet ports at predetermined positions in the delivery and return strokes of the piston. Suitably this is achieved by providing retaining means at the inner end of the piston for engaging one end of the tubular sleeve and stop means on the piston for engaging the other end of the sleeve thereby to determine the first and second positions of the tubular sleeve relative to the piston. Sealing means, such as one or more O-rings, are preferably carried by the tubular sleeve and create friction between the tubular sleeve and the wall of the cylinder. The effect of this is that on sliding movement of the piston the tubular sleeve is initially held stationary relative to the cylinder until it is engaged by a respective one of the retaining means or the stop means whereafter both the piston and the sleeve move together for the remainder of the stroke of the piston.

The substance to be dispensed is admitted through the inlet port to the cylinder space behind the end of the piston. As the piston is depressed manually from its outer position to begin a working stroke, the tubular sleeve initially remains stationary in the cylinder and the piston slides through the sleeve until the sleeve contacts the stop means on the piston. By the time this position has been reached, the tubular sleeve has closed the inlet port and has opened the outlet port. Contact of the stop means with the tubular sleeve entrains the tubular sleeve for further movement with the piston, sliding in the cylinder, and soap is expelled out of the cylinder space through the outlet port and the longitudinal passageway in the piston through the remainder of the working stroke. At the end of the working stroke, the piston is released and the spring is allowed to return it to its outer position. Friction again holds the tubular sleeve stationary in the cylinder for the initial part of the return movement of the piston, and during this initial movement and while the inlet port still remains closed, the pressure in the cylinder space falls to below atmospheric which causes some of the substance in the outlet passageway to be drawn back into the cylinder space through the outlet port. This positive drawing or sucking back prevents substance remaining in the outlet passageway from dripping out of the end thereof and eliminates the need to provide a one way sealing nozzle at the dispensing outlet such as has been frequently necessary with dispenser pumps. Suction continues until either the piston has returned outwardly a sufficient distance to close the outlet port completely or to open the inlet port. Preferably the outlet port and the inlet port are axially separated by a distance substantially equal to the axial length of the tubular sleeve whereby as one of the ports is opened the other port is simultaneously closed. When the inlet port is opened, the cylinder space begins to refill with substance to be dispensed and by the end of the outward stroke the parts return to their original positions in which the tubular sleeve is engaged by the retaining means on the piston.

Preferably the tubular sleeve and the stop means and the retaining means are so arranged and configured so as to make only point contact when engaged. This prevents the tubular sleeve from locking with the piston and ensures that the sleeve remains stationary during the initial part of both the delivery and return strokes of the piston.

In a preferred form of construction, a manually engageable delivery head is attached to the outer end of the piston and incorporates a downwardly directed delivery passage which communicates with the longitudinal outlet passage in the piston. The spring may then be mounted between the delivery head and a radially outwardly projecting flange on the cylinder.

The above and other objects and advantages of the present invention will become further apparent from the following description of a reciprocating dispensing pump according to the present invention, reference being made to the accompanying drawings.

BRIEF DESCRIPTION OF THE DRAWINGS.

FIGS. 2 to 5 are sectional views illustrating the pump respectively in different operational conditions.

Figure 1:
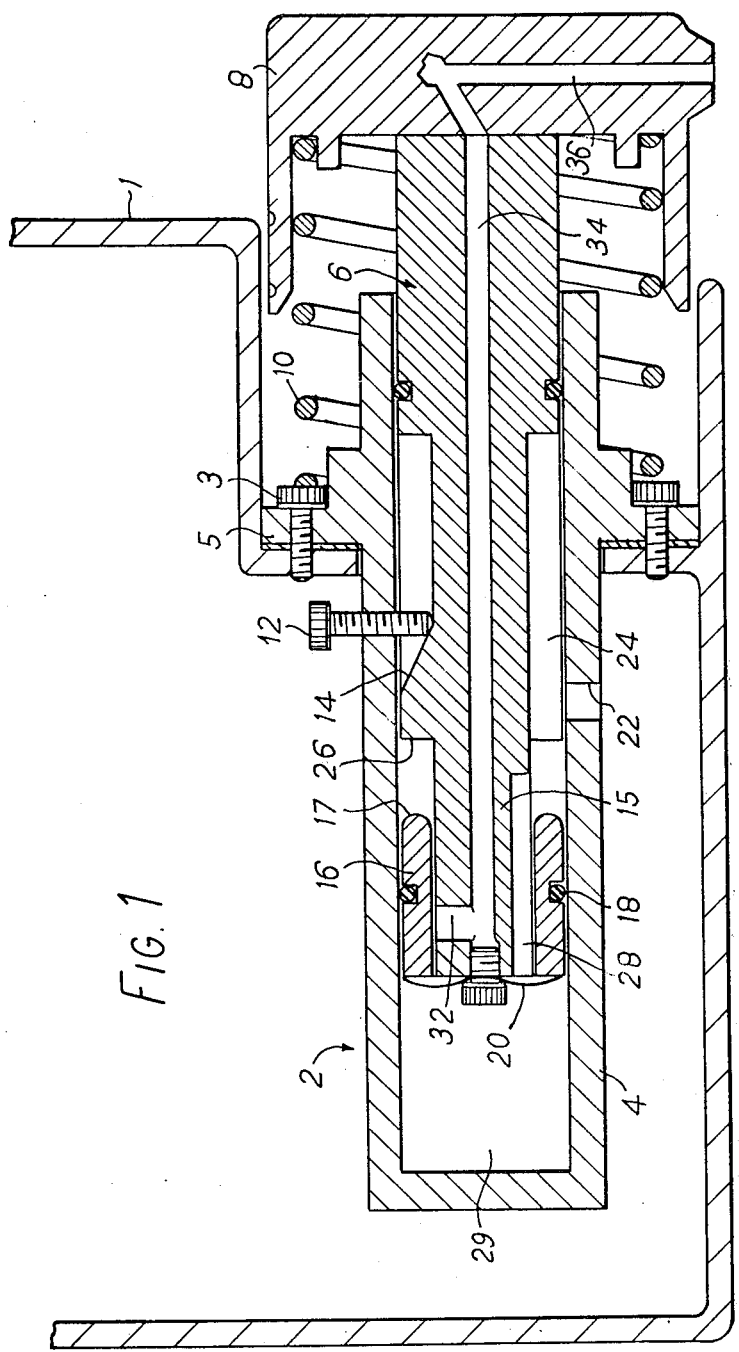
FIG. 1 is a longitudinal section through the reciprocating pump mounted in a soap dispenser.

DESCRIPTION OF THE PREFERRED EMBODIMENT.

FIG. 1 shows part of a soap dispenser provided with a dispensing pump according to this invention. The soap dispenser comprises a storage container 1 for holding a quantity of a fluent soap preparation to be dispensed, the lower part only of the container wall being shown. A reciprocating pump 2 is attached to the container wall by screws 3.

The pump 2 comprises a cylinder 4 and a piston 6 slidable in the cylinder. A radially outwardly projecting flange 5 on the cylinder provides a means whereby the pump 2 is attached to the container wall by the screws 3 so that the major portion of the pump is located within the storage container 1 to be immersed in the soap preparation stored in the container. A delivery head 8 is rigidly attached to the outer end of the piston 6, and a return spring 10 mounted between head 8 and the flange 5 urges the piston outwardly into the outer or rest position illustrated in FIGS. 1 and 2. A locking screw 12 screwed through the wall of the cylinder engages a sloping face 14 on the piston to prevent the piston 6 from being withdrawn from the cylinder.

The inner end portion 15 of the piston 6 within the cylinder 4 is of reduced diameter as compared with the diameter of the remainder of the piston and of the cylinder 4. A tubular sleeve 16 is slidably mounted on the reduced diameter inner end portion 15. An O-ring 18 fitted in the sleeve 16 provides a seal with the wall of the cylinder 4. A retaining means 20 is attached to the inner end of the piston to prevent the sleeve 16 from sliding off the end of the piston.

A feed orifice 22 through the wall of the cylinder 4 is permanently in communication with a longitudinal slot 24 in the piston 6. Slot 24 opens onto an annular shoulder 26 formed on the piston at the outer end of the reduced diameter end portion 15, and an inlet port 28 comprised by a second longitudinal slot in the piston runs along portion 15 from the inner end to a position short of the shoulder 26. With the piston 6 in its furthest outward position as shown, a space 29 at the inner end of the cylinder fills with fluent soap preparation to be dispensed which has been drawn from the storage container 1 into the pump through orifice 22, slot 24, and inlet port 28. Retaining means 20 is constructed such that soap can flow around or through it freely into and from the space 29. Arrows 30 in FIG. 2 illustrate the flow of soap preparation.

Shoulder 26 acts as a stop means for engaging the forward end 17 of the sleeve 16 to define one extreme position of axial displacement of the sleeve 16 relative to the piston 6. The other extreme position is defined by the inner end of the sleeve 16 engaging the retaining means 20. In the embodiment illustrated, the retaining means 20 takes the form of a star washer.

An outlet port 32 opening radially onto the reduced diameter end portion 15 of piston 6 leads into a longitudinal passageway 34 in the piston. A downwardly directed delivery passage 36 in the delivery head 8 communicates with the outer end of the outlet passageway 34.

The operation of the pump will now be described with reference to FIGS. 2 to 5.

In FIG. 2 the piston is shown in its furthest outward position, into which it is urged by the spring 10. Locking screw 12 is in engagement with face 14, and the sleeve 16 is in a rearward position with respect to piston 6 in which it is contacted by retaining means 20. The space 29 in the cylinder is filled with soap preparation which has entered according to arrows 30.

To obtain delivery of a predetermined quantity of soap preparation, delivery head 8 is manually depressed. As the piston 6 commences its inward stroke, frictional engagement between the O-ring 18 and the cylinder 4 holds the sleeve 16 stationary relative to the cylinder and the piston begins to move through the sleeve 16. During the first part of this movement the outlet port 32 remains closed and soap begins to flow back from space 29 to the storage container 1 until communication is cut off by the forward end 17 of the sleeve sealing off the inlet port 28. Simultaneously the outlet port 32 begins to open. When port 32 opens soap trapped in space 29 is forced out of space 29 through outlet port 32 into passageway 34. Port 32 is fully opened by the time the forward end 17 of the sleeve engages and contacts the annular shoulder 26, FIG. 3. Thereafter continued inward movement of the piston causes the sleeve 16 to move bodily with the piston 6. Soap is dispensed out of passage 36 in head 8, see arrows 38, FIG. 4, until movement of the piston is checked by engagement of the head 8 with the outer end of the cylinder 4.

The head 8 is now released and spring 10 returns head 8 and piston 6 to the outward position. Friction with the cylinder wall again holds sleeve 16 stationary relative to cylinder 4 during the initial return movement of the piston and, while inlet port 28 is still closed by sleeve 16 preventing communication with slot 24 and storage container 1, a pressure lower than atmospheric is created in space 29 which acts to suck back soap still in passages 34 and 36 as represented by arrows 40 FIG. 5. This positive suck back of soap prevents drips from delivery head 8 and makes the provision of a one-way self-sealing delivery nozzle unnecessary at the end of the dispensing passage 36. Suck back ceases when the piston 6 has returned outwardly a sufficient distance that sleeve 16 uncovers the forward end of the inlet port 28 or has closed the outlet port 32. The axial length of sleeve 16 should be at least equal to the distance $x$, FIG. 5, between the extreme inner edge of the outlet port 32 and the extreme outer edge of the inlet port 28. Space 29 then commences to refill with soap from container 1. Sleeve 16 is engaged by retaining means 20 and thereafter moves with the piston 6 until the parts finally assume the positions shown in FIGS. 1 and 2.

Sleeve 16 thus acts as a slide valve controlling the inlet and outlet ports 28 and 32 at predetermined positions in the delivery and return strokes of the piston 6 and its operation is controlled by the movement of the piston 6 in the cylinder 4.

It is advisable that the forward end 17 of the sleeve make only point contact with the annular shoulder 26 to prevent a hydrostatic lock forming that would cause sleeve 16 to move with piston 6 immediately after the delivery head 8 is released. Such point contact can be assured by providing high points on the forward end 17 of the sleeve or on the face of shoulder 26. Similarly it is advisable that there should be only point contact between the rearward end of the sleeve 16 and the retaining means 20.

The length of stroke of the piston determines the quantity of soap that is delivered on each operation of the piston, and provision may be made for the length of stroke to be adjusted. It will be appreciated that since face 14 is a sloping face, the extent to which locking screw 12 is caused to project into the cylinder 4 will determine the outward position of the piston and hence the length of stroke. Alternatively, sloping face 14 could be replaced by a series of steps to provide more positive stroke adjustment. An alternative manner of adjusting the stroke would be to provide an adjustable stop, for example, a screw passing through the end wall of the cylinder, which contacts the end of the piston to determine the inward stroke of the piston.

A pair of longitudinally spaced O-rings 18 may be provided on the sleeve 16 if, due to the use of a single O-ring 18 as illustrated, any tendency is found for the sleeve 16 to tilt and stick.

The pump may be fabricated in any suitable material, for example in metal or in moulded plastics material. It is preferred to use materials which have low friction characteristics for those surfaces over which sliding takes place.

I claim:

1. A reciprocating dispensing pump comprising:
   a cylinder adapted to be attached to a product container, said cylinder having an open outer end and an inner end;
   a piston slidably extending into said cylinder through said outer end thereof, said piston having an inner end defining with said inner end of said cylinder a space, said piston having adjacent said inner end thereof a reduced diameter length portion, said piston being movable inwardly of said cylinder from an outer first position to an inner second position;
   spring means positioned to urge said piston to said outer second position;
   said piston having therein a longitudinally extending outlet passage;
   said piston having therein a product outlet port connecting said space and said outlet passage;
   said piston having therein a product inlet port opening into said space independently of said outlet passage;
   said outlet port having an extreme inner edge, said inlet port having an extreme outer edge, said extreme inner and outer edges being spaced by a first axial length;
   a tubular sleeve slidably mounted on said reduced diameter length portion, said sleeve being axially displaceable relative to said piston between a first sleeve position and a second sleeve position in response to movement of said piston between said outer first and inner second positions of said piston;
   said sleeve having an axially extending portion of a second axial length at least equal to said first axial length, said axially extending portion being completely solid and unperforated;
   said axially extending portion of said sleeve, when said sleeve is in said first sleeve position, closing said outlet port, thereby blocking communication between said space and said outlet passage and being axially spaced from and thereby uncovering said inlet port;
   said axially extending portion of said sleeve, when said sleeve is in said second sleeve position, closing said inlet port and being axially spaced from and thereby uncovering said outlet port, thereby allowing communication between said space and said outlet passage;
   said axially extending portion of said sleeve never simultaneously uncovering both said inlet and outlet ports; and
   said axially extending portion of said sleeve, during initial relative movement of said sleeve from said second sleeve position to said first sleeve position in response to initial movement of said piston from said inner second position to said outer first position, maintaining said inlet port blocked and said outlet port unblocked, such that a reduced pressure is created in said space and in said outlet passage, thereby withdrawing any product in said outlet passage inwardly therefrom into said space.

2. A pump as claimed in claim 1, wherein said inner end of said cylinder is completely closed and axially spaced from said inner end of said piston.

3. A pump as claimed in claim 1, further comprising a manually engageable delivery head attached to the outer end of said piston and including a downwardly directed delivery passage communicating with said outlet passage and wherein said spring is mounted between said delivery head and a radially outwardly projecting flange of said cylinder.

4. A pump as claimed in claim 1, further comprising means for adjusting the length of the stroke of said piston.

5. A pump as claimed in claim 1, further comprising retaining means at said inner end of said piston for engaging a first end of said tubular sleeve to determine said first sleeve position, and stop means on said piston for engaging a second end of said sleeve to determine said second sleeve position.

6. A pump as claimed in claim 5, wherein said inlet port comprises a slot extending longitudinally of said reduced diameter length portion of said piston from the inner end thereof and terminating short of said stop means.

7. A pump as claimed in claim 5, wherein said retaining means comprises a star washer.

8. A pump as claimed in claim 5, wherein contact between said tubular sleeve and said stop means and between said tubular sleeve and said retaining means comprises only point contact.

9. A pump as claimed in claim 5, further comprising sealing means carried by said tubular sleeve and frictionally engaging the inner wall of said cylinder, such that upon sliding movement of said piston said tubular sleeve is initially held stationary relative to said cylinder until engaged by a respective one of said retaining means or said stop means, whereafter said sleeve moves together with said piston for the remainder of the stroke of said position.

10. A pump as claimed in claim 9, wherein said sealing means comprises at least one O-ring seal.

11. A pump as claimed in claim 5, wherein said stop means comprises an annular shoulder.

12. A pump as claimed in claim 11, further comprising a feed orifice in the wall of said cylinder, and a slot in said piston permanently in communication with said orifice and opening onto said annular shoulder.

* * * * *